United States Patent [19]

Germain

[11] 4,069,584

[45] Jan. 24, 1978

[54] GRASS SHEARS

[75] Inventor: Robert A. Germain, Ashtabula, Ohio

[73] Assignee: True Temper Corporation, Cleveland, Ohio

[21] Appl. No.: 749,891

[22] Filed: Dec. 13, 1976

[51] Int. Cl.² .......................... A01G 3/06; B26B 13/26
[52] U.S. Cl. .......................................... 30/238; 30/248
[58] Field of Search ................. 30/204, 237, 238, 239, 30/248, 251

[56] References Cited

U.S. PATENT DOCUMENTS

| 467,025 | 1/1892 | Wreden | 30/239 |
| 1,969,129 | 8/1934 | Harz | 30/238 |
| 2,679,096 | 5/1954 | Wallace | 30/248 |
| 3,036,379 | 5/1962 | Katzfey | 30/248 |

FOREIGN PATENT DOCUMENTS

| 161,139 | 3/1921 | United Kingdom | 30/239 |

Primary Examiner—Jimmy C. Peters

[57] ABSTRACT

A pair of grass shears comprising a stationary blade to which a first handle is affixed, a movable blade operatively connected to a second handle, first and second cooperating slots and posts in the respective blades for guiding the movable blade both in the direction of the handles and in a rotational path across the fixed blade as the handles move the blades between open and closed positions.

5 Claims, 6 Drawing Figures

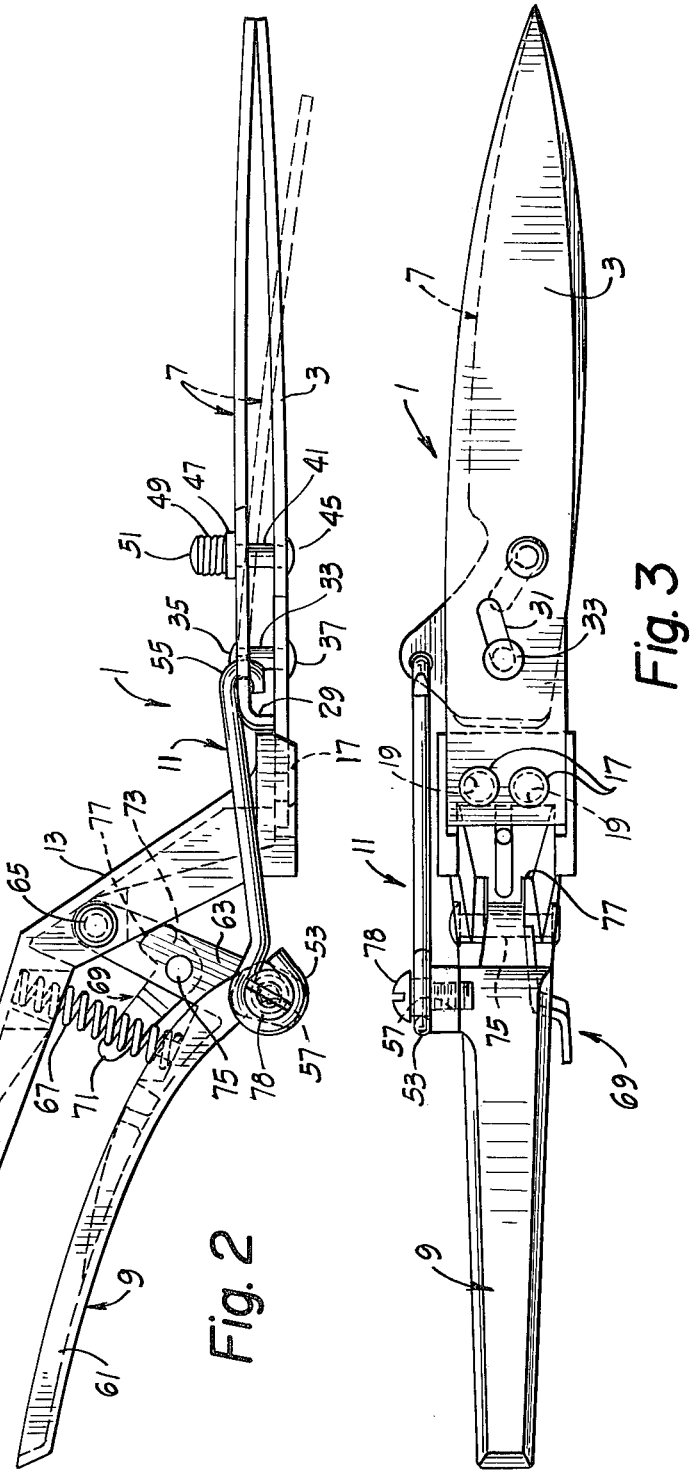

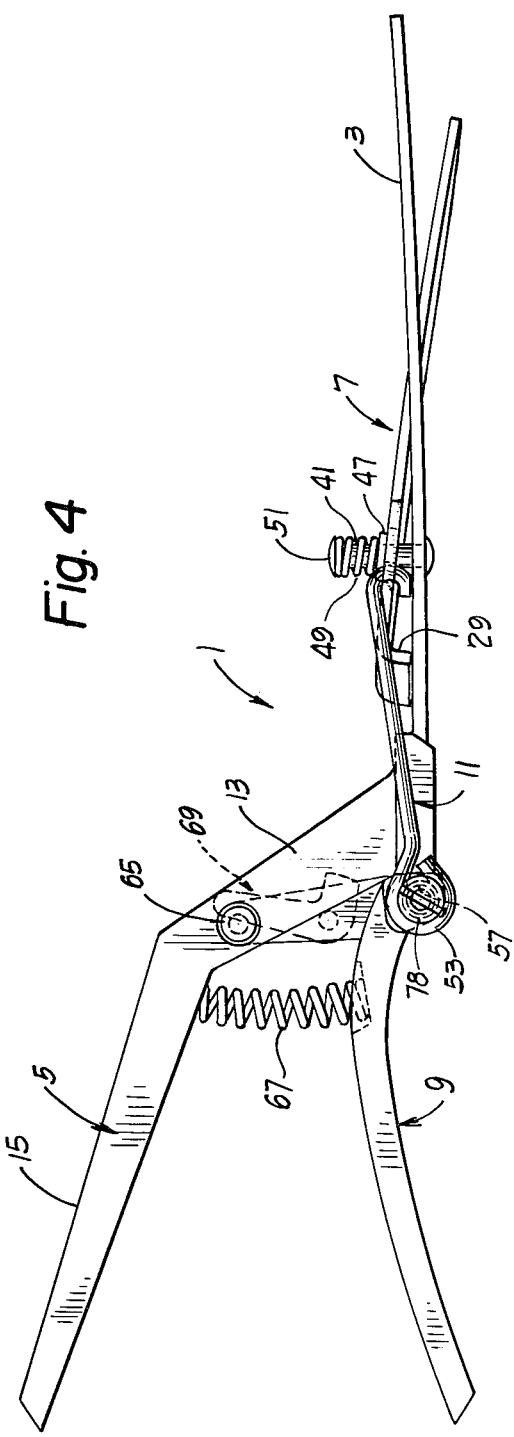
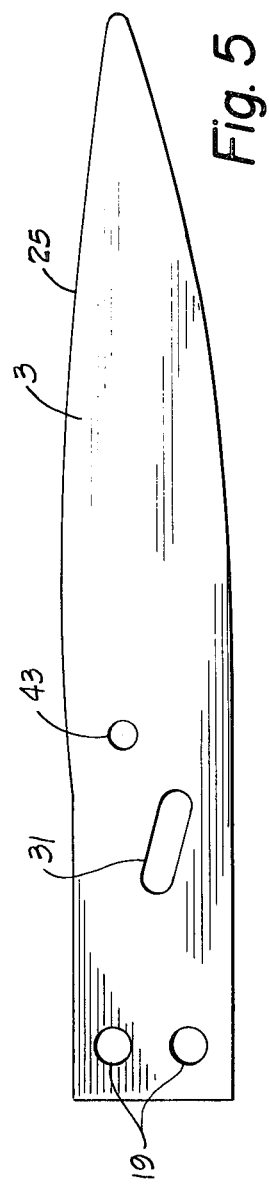
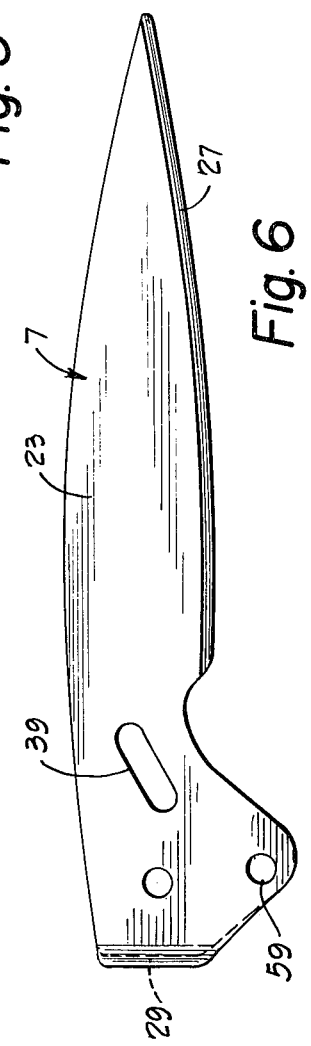

GRASS SHEARS

The present invention relates to cutting implements, and in particular, to grass shears.

A substantial variety of grass shears are known in the art with which gardeners can cut grass and other forms of small vegetation. Grass shears generally comprise a pair of blades which are relatively movable in a horizontal plane for severing small amounts of vegetation of the type generally inaccessible to a lawnmower. Various attempts have been made, with varying degrees of success, to render grass shears easily operable to sever vegetation without requiring great effort on the part of the user of the implement. Accordingly, grass shears are well known wherein various linkages and springs are provided to assist in the cutting and blade-opening functions, and wherein advantageous use of leverage is made to reduce the required force for operating the shears. It is further known to provide various means for increasing the contact between the blades to improve their cutting action. The latter means include springs for biasing the blades together, and providing the blades with a bowed configuration whereby the planes of the blades intersect while in their open position. Furthermore, although most known grass shears include a fixed pivot pin about which the blades are relatively rotatable, it is known to draw the pivot position towards the blades to get the combined benefits of the rotational movement and a slicing action. Despite the advances which have been made in this art over the years, known grass shears frequently require significant amounts of manual force to operate the shears, and the shears frequently become jammed in use by virtue of vegetation cinched between the blades.

There are known grass shears and similarly-operable cutting instruments wherein cooperating slots and posts extending therethrough are provided for guiding the blades through paths of movement. U.S. Pat. No. 3,375,581 discloses a pair of grass shears including a fixed blade having an elongated slot, and a movable blade rotatable about a fulcrum pin fixed to the movable blade and slidable in the slot in the fixed blade. U.S. Pat. No. 1,204,482 discloses a pair of pruning cutters having a fixed blade and a movable blade, each having slots through which posts extend for guiding the blades in their relative paths of movement.

The following group of patents disclose various grass shear constructions and other cutting implements which describe the features discussed above and other features relating to the subject matter of the present invention: U.S. Pat. Nos. 117,888; 1,179,595; 1,324,598; 1,354,968; 1,562,630; 1,784,022; 2,010,576; 2,277,442; 2,503,978; 3,110,963; 3,325,896; and 3,296,697.

It is an object of the present invention to provide improved grass shears.

Another object of the invention is to provide a pair of grass shears which are easily operable to cut vegetation without requiring undue amounts of manual force.

Still another object of the invention is to provide a pair of grass shears for effectively cutting grass and other light vegetation.

A further object of the invention is to provide an improved pair of grass shears wherein the contact between the blades at their cutting edges is sufficient to enhance the cutting action of the blades, while not impeding the relative movement of the blades across each other.

It is an additional object of the present invention to provide an improved pair of grass shears having a small number of parts which can be manufactured using conventional manufacturing techniques.

A general object of the invention is to provide an improved pair of grass shears which are easy to use, and effective and efficient in operation.

Other objects will be apparent from the description to follow and from the appended claims.

The foregoing objects are achieved by the provision of a pair of grass shears comprising a generally flat first blade disposed in a plane and having a first cutting edge; a first handle fixed relative to the first cutting blade and being offset from the plane of that blade; a second blade having a second cutting edge and overlying the first blade; a second handle movable relative to the first handle and operatively connected to the second blade for moving the second blade across the first blade; a first slot in the first blade extending in a direction toward the first handle and a first post fixed in the second blade and extending through the first slot, the first slot and second post guiding the second blade across the first blade in the direction of the first handle in response to the movement of the second handle; a second slot in the second blade extending in a direction transverse to the cutting edge of the first blade and a second post fixed in the first blade and extending through the second slot, the second slot and second post guiding the second blade in a rotational path across the first blade in further response to the movement of the second handle; the slots and posts simultaneously drawing the second blade towards the first handle and rotating the second blade across the first blade to move the cutting edges across each other, in response to the movement of the handles from their open position to their closed position, and the blades moving in the reverse direction when the handles move from the closed to the open position.

FIG. 1 is a top view of a pair of grass shears according to the present invention showing the blades in their closed and open positions;

FIG. 2 is a side view of grass shears according to the invention in their open and closed positions;

FIG. 3 is a bottom view of the foregoing grass shears in their closed position;

FIG. 4 is a side view of the grass shears according to the invention in their open position; and FIGS. 5 and 6 are top views of the blades of the grass shears shown in FIGS. 1 through 4.

The preferred embodiment of the invention described below is a pair of grass shears comprising a stationary lower blade secured to a stationary upper handle, a movable upper blade overlying the stationary blade and operatively connected to a movable handle situated beneath the stationary handle. A slot is provided in a stationary blade for receiving a fixed post extending downwardly from the movable blade for guiding the movable blade in a generally linear path. Another slot is provided in the upper blade for receiving an upwardly extending post mounted on the lower blade, for guiding the movable blade in a rotational path across the fixed path. The upper blade is bowed or concave relative to the stationary blade and has a depending lug for rendering the general plane of the movable blade transverse to the plane of the stationary blade for enhancing the contact between the blades at their cutting edges. The blades are spring-biased together, and the handles are spring-biased to their open position. A latch is provided for selectively locking the blades in their closed position.

Turning now to the drawings, a pair of grass shears 1 is shown comprising a first or stationary blade 3 fixed to a first or stationary handle 5, and a second or movable blade 7 disposed over stationary blade 3 and operatively connected to a second or movable handle 9 by means of an arm or link pin 11.

Stationary blade 3 can be flat or slightly concave relative to movable blade 7. Blade 3 can be integral with stationary handle 5, and the blade and handle could accordingly be fabricated from a single piece of metal such as an appropriately stamped piece of sheet steel stock. However, the drawings show handle 5 to be a plastic unit extending upwardly from the general cutting plane of the blades and having an oblique portion 13 connected to blade 3 and an upper, manually-graspable portion 15 which is inclined towards the horizontal from the upper part of portion 13. The handle can also be formed of aluminum, zinc or other suitable material. A pair of depending posts 17 extend downwardly from the lowermost part of handle 5. Posts 17 are dimensioned to pass through a corresponding pair of holes 19 in stationary blade 3; the free ends of posts 17 extending over the sides of holes 19 to secure blade 3 to handle 5. Handle 5 includes various recesses, indicated generally by the numerical designation 21, which are provided for reducing the material requirements of the handle and for enhancing its appearance.

Upper or movable blade 7 includes a main portion 23 which is slightly bowed or concave relative to similarly configured blade 3, as indicated most clearly in FIG. 2. This configuration increases the contact or pressure between the blades at the intersection of their cutting edges to improve the cutting action thereof as the blades move from their open to their closed positions. In this regard, blades 3 and 5 are provided with cutting edges 25 and 27, respectively. Blade 7 further includes a downwardly depending lug 29 whose free end surface abuts against the upper surface of stationary blade 3 and slides across the latter blade in response to the movement of blade 7. Lug 29 effects an inclination of movable blade 7 relative to stationary blade 3 so that the respective planes of the two blades intersect. Such inclination further increases the pressure or contact between the blades at their cutting edges to increase the cutting action of the grass shears as the blades move from their open to their closed position. As shown most clearly in FIG. 6, lug 29 extends only partially across blade 7 on the opposite side of the blade from the cutting edge thereof, so that it tends to cant movable blade 7 along the longer dimension thereof with the effect of urging the cutting edge of blade 7 against stationary blade 3 while lifting the opposite edge of blade 7 from the surface of the lower blade, to reduce the friction between the blades as they move across each other.

The path of movement of blade 7 relative to stationary blade 3 is controlled by a pair of post and slot arrangements. Accordingly, blade 3 is provided with a generally elongated, straight slot 31 which extends in the general direction of stationary handle 5. A post or rivet 33 depends from upper blade 7 and extends through slot 31. Post 33 has upper and lower expanded head portions 35 and 37, respectively, for retaining the post in the respective blades. When sufficient force is applied to upper blade 7 in the general direction of slot 31, post 33 slides in slot 31 to move blade 7 in the direction of the slot.

A second slot 39 is provided in movable blade 7 and extends in a direction transverse to the direction of cutting edges 25 and 27, and towards stationary blade 3. A second post or rivet 41 is mounted in stationary blade 3 and extends upwardly through slot 39. The lowermost portion of post 41 extends through an aperture 43 (FIG. 5) in blade 3 and terminates in an expanded head 45 for retaining post 41 in blade 3. The upper portion of post 41 extends through slot 39 and through a plastic washer or springer retainer 47 seated on the upper surface of blade 7, and further through a coil spring 49 seated on the washer. The uppermost part of post 41 comprises an expanded head 51 whose diameter exceeds the diameter of coil spring 49 so that retainer 47 and head 51 cooperate to retain spring 49 therebetween.

Washer 47 slides freely on post 41, and its outer diameter exceeds the width of slot 39 so that washer 47 can slide across the upper surface of blade 7 in the area of the slot. Spring 49 exerts a continually increasing force against washer 47 as the shear closes, and forces upper blade 7 downwardly against stationary blade 3. The spring force thus biases the blades together, particularly at their cutting edges, for enhancing the cutting effect of the blades. It is significant that the force between the blades at their cutting edges is thus enhanced by the action of spring 49, by the respective concavities of the two blades, and by the effect of lug 29 in biasing the general plane of blade 7 in a direction transverse to the general plane of stationary blade 3.

Arm 11 is shown as comprising a wire form having, at its opposite ends, a loop 53 and a hook 55 respectively, secured at one end around screw 78 in movable handle 9 and at an opposite end in a hole 59 in movable blade 7. Slots 31 and 39 are transverse to each other, and arm 11 is connected to blade 7 at a position offset from a line parallel to slot 31 and extending through post 41, whereby the application of force to arm 11 in the direction of slot 31 also applies a torque to blade 7 about post 41. Therefore, the application of force to arm 11 tending to move blade 7 in the direction of slot 31 concurrently tends to pivot blade 7 about post 41.

Movable handle 9 includes a gripping portion 61 which is generally parallel and co-extensive with portion 15 of stationary handle 5, and a pair of parallel leg members 63 which extend upwardly and perpendicularly from portion 61 into a recess defined in portion 13 of stationary handle 5. Legs 63 are apertured for receiving an axle or pivot rivet 65 which extends through corresponding aligned apertures in handle 5, handle 9 being mounted for pivotal movement about axle 65. The axis of axle 65 is perpendicular to leg 63 and generally parallel with the cutting plane of the grass shears. A spring such as compression spring 67 is mounted on appropriate mounting means between handles 5 and 9, for biasing handles 5 and 9 apart towards their open position.

A latching lever or lock plate 69 is provided for locking the grass shears in a closed condition wherein the blades are closed as shown by the solid lines in FIG. 1. The latch lever comprises an L-shaped element having a relatively long leg 71 and a short leg 73. Latch lever 69 is mounted for pivotal movement about an axle 75 which extends between legs 63 of movable handle 9. The underside of stationary handle 5 includes a retaining or locking surface 77, which is configured to engage leg 73 when the latter is intentionally moved into engagement therewith. The latter is accomplished by closing handles 5 and 9, and rotating latch lever 69 in a clockwise direction, whereby leg 73 moves into the path of surface 77. Latch lever 69 then retains the handles in the closed position. When latch lever 69 is rotated counterclockwise from the latter position, the spring force of spring 67 urges the handles 5 and 9 to their open position.

Grass shears 1 are operated in the conventional manner. The shears are normally in their open position as shown in FIG. 4, where blade 7 is in the dotted-line position shown in FIGS. 1 and 2. Handles 5 and 9 are manually grasped and movable handle 9 is moved towards handle 5. The foregoing action causes handle 9 to pivot about axle 65, and arm 11 is drawn rearwardly (away from the points of the blades), pivoting at its connection with handle 9. The rearward movement of arm 11 simultaneously draws blade 7 rearwardly in the path established by post 33 and slot 31, and pivots blade 7 about post 41. When manual pressure is released from lower handle 9, spring 67 pivots handle 9 in a counterclockwise direction about axle 65 to reverse the foregoing movements of the blades and handles until the blades reach their fully open position.

Conventional techniques and materials are envisioned for manufacturing the component parts of the grass shears described above. The two blades are preferably fabricated from a suitable carbon steel. The apertures and slots are preferably punched in a single operation, and lug 29 in blade 7 can be formed using known stamping techniques. The concavity of the blades can be similarly formed, but when the blades are formed from coiled sheet stock, the inherent concavity imparted from the coil of stock itself may make a separate operation unnecessary. The cutting edges of the blades are preferably ground thereon. Posts 33 and 41 can be conventional commercial case-hardened rivets. Arm 11 can advantageously comprise carbon steel wire. The latch is preferably fabricated from sheet stock in an operation which simultaneously blanks and forms the part to the desired shape. Portion 61 of lower blade 9 could be integral with portion 63 and fabricated as an aluminum or zinc die casting or otherwise made from a single piece of steel or other metal, or portion 61 could be a plastic handle permanently bonded to portion 63, or the entire movable handle 9 could be fabricated as a molded plastic or cast metal product.

The invention has been described in detail with particular reference to the preferred embodiment thereof, but it will be understood that variations and modifications within the spirit and scope of the invention may occur to those skilled in the art to which the invention pertains.

I claim:

1. A pair of grass shears comprising:
   a generally flat fixed blade disposed in a plane and having a first cutting edge;
   a first handle fixed relative to said first blade;
   a movable blade overlying said fixed blade and having a second cutting edge, said movable blade being movable between an open position and a closed position;
   a second handle movable relative to said first handle and operatively connected to said movable blade for moving said movable blade across said fixed blade, said second handle being movable between open and closed positions corresponding to the open and closed positions of said movable blade;
   a first spring connected to said first and second handles for biasing said second handle to the open position;
   a first slot in said fixed blade extending in a direction towards said first handle and a first post fixed in the movable blade and extending through said first slot; said first slot and said first post guiding said movable blade across said fixed blade in the direction of said first handle in response to the movement of said second handle;
   a second slot in said movable blade extending in a direction transverse to said first cutting edge and a second post fixed in the said fixed blade and extending through said second slot; a second spring mounted on said second post for biasing said movable blade against said fixed blade, said second slot and said second post guiding said movable blade in a rotational path across said fixed blade in response to the movement of said second handle;
   said slots and posts simultaneously drawing said blade towards said first handle and rotating said movable blade across said fixed blade to move said cutting edges across each other, in response to the movement of said handles from their open position to the closed position.

2. The invention according to claim 1 and further comprising mounting means for mounting said second handle for pivotal movement relative to said first handle in a direction generally perpendicular to the plane of said fixed blade, wherein said second handle is operatively connected to said movable blade by arm means interconnecting said second handle and said movable blade for moving said movable blade in response to movement of said second handle.

3. The invention according to claim 1 wherein said movable blade is generally flat and is disposed in a plane transverse to the plane of said fixed blade for enhancing the contact between said blades at their cutting edges.

4. The invention according to claim 3 wherein said movable blade comprises a projection extending towards and against said fixed blade for maintaining the plane of said movable blade transverse to the plane of said fixed blade.

5. The invention according to claim 4 wherein at least one of said blades is slightly convex to the other of said blades for enhancing the contact between the blades at their cutting edges.

* * * * *